United States Patent [19]

Hayashida et al.

[11] 3,977,193
[45] Aug. 31, 1976

[54] HYDRAULIC BRAKING FORCE MULTIPLYING DEVICE

[75] Inventors: Yoshihiro Hayashida, Chigasaki; Tetsuo Haraikawa, Funabashi, both of Japan

[73] Assignee: Tokico Ltd., Japan

[22] Filed: July 2, 1974

[21] Appl. No.: 485,138

[30] Foreign Application Priority Data

July 11, 1973 Japan.............................. 48-78642
Aug. 9, 1973 Japan.............................. 48-89443
Oct. 19, 1973 Japan.............................. 48-117607

[52] U.S. Cl................................. 60/547; 91/434; 60/552; 91/391 R
[51] Int. Cl.² ......................................... F15B 7/00
[58] Field of Search ............ 60/547, 548, 553, 552, 60/556, 557; 91/370, 376, 434, 369 A

[56] References Cited
UNITED STATES PATENTS

| | | | |
|---|---|---|---|
| 2,410,269 | 10/1946 | Chouings ........................ | 91/376 X |
| 3,298,177 | 1/1967 | Kellogg .......................... | 60/548 |
| 3,827,242 | 8/1974 | Belart ............................. | 60/552 |

Primary Examiner—Martin P. Schwadron
Assistant Examiner—H. Burks, Sr.
Attorney, Agent, or Firm—Wenderoth, Lind & Ponack

[57] ABSTRACT

A hydraulic braking force multiplying device has:
a body coupled to a master cylinder;
a projecting portion provided in the body and projecting toward the master cylinder;
a cup-shaped power piston one open end of which receives the outer periphery of the projecting portions slidably and sealingly relative thereto, and the other closed end of which is adapted to actuate a piston of the master cylinder;
a working chamber defined between the power piston and the projecting portion;
a bore extending through the body and coaxial with the piston of the master cylinder;
a valve member slidably fitted in the bore and having one end extending into the working chamber;
a spring urging the valve member in the direction away from the working chamber;
a bore provided in the valve member coaxially therewith and communicating with the working chamber;
a first pressure chamber defined between the bore of the body and the outer periphery of the valve member and normally communicating with a pressure source;
a normally closed first valve for controlling communication between the first pressure chamber and the bore of the valve member;
an input shaft slidably disposed within the bore of the body in the axial direction thereof and having a bore communicated with a fluid reservoir; and,
a normally open second valve disposed between the end portion of the input shaft and the valve member.

The second valve closes and the first valve opens when the input shaft is actuated, whereby fluid pressure is created in the working chamber, and, either one of the valve or valve seat of the first or the second valve is resiliently moved in response to fluid pressure in the working chamber, so that the second valve is closed when the first valve is maintained closed.

5 Claims, 5 Drawing Figures

Fig. I

HYDRAULIC BRAKING FORCE MULTIPLYING DEVICE

This invention relates to a hydraulic braking force multiplying device for use in an automobile.

A hydraulic braking force multiplying device, in general, is connected to a master cylinder and actuated by hydraulic pressure. The devices of this type are classified into two groups from the viewpoint of a brake pedal: one is the so-called "stroke type", in which the stroke of an input shaft corresponds to a quantity of fluid required for actuating a piston of a master cylinder, and the other is the so-called "non-stroke type", in which the necessary stroke of the input shaft is only a change-over stroke of a change-over valve to attain the intended purpose. The former type is attended with a drawback that a driver suffers from fatigue, while the latter relieves a driver's fatigue, but still involves a shortcoming that failure in the source of pressure fluid results in a defect in the whole system. In either type, the heretofore proposed devices are complicated in construction, and hence a large sized device results, requiring a large space for mounting the same. In addition, the device is expensive.

It is accordingly a primary object of the present invention to provide a hydraulic braking force multiplying device of the so-called non-stroke type, which is so designed as to directly actuate a master cylinder in the case of failure of the source of pressure fluid, thereby improving the safety of the device.

Another object of the present invention is to provide a hydraulic braking force multiplying device of the so-called non-stroke type, wherein a driver is given an improved operating feeling.

These and other objects and features of the present invention will be apparent from the following specification in conjunction with drawings which show preferred embodiments of the invention.

BRIEF DESCRIPTION OF THE DRAWINGS:

Referring to FIG. 1, which shows an embodiment of a hydraulic braking force multiplying device of the present invention, shown at 1 is the body, which is integrally attached through a cylindrical spacer 2 to a master cylinder 3.

Figure 1:
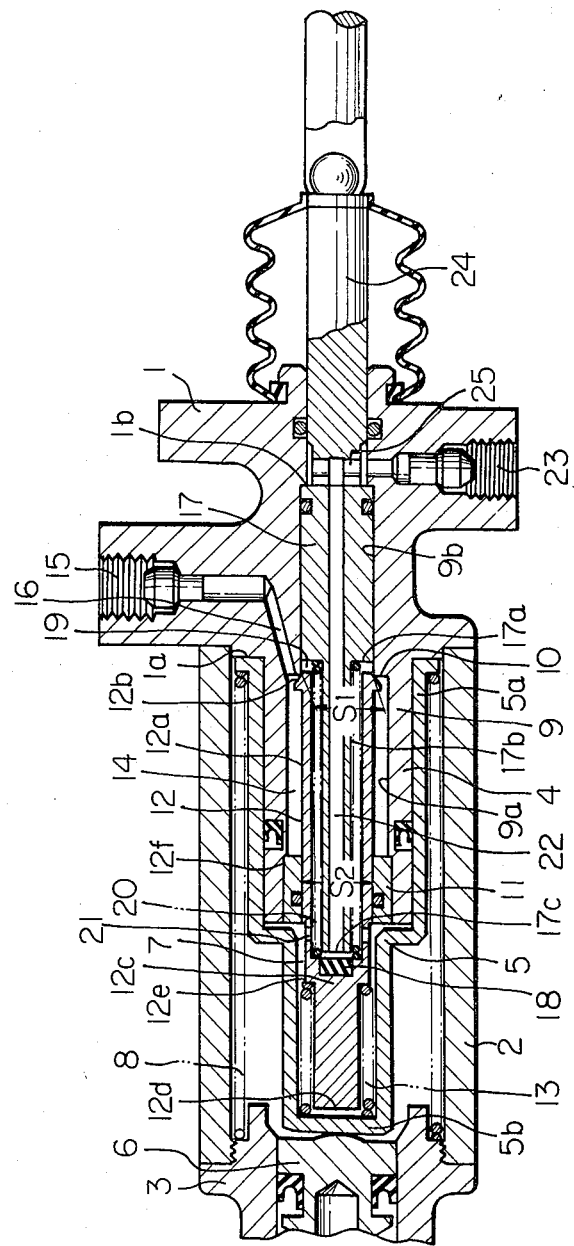
FIG. 1 is a longitudinal cross-sectional view of a first embodiment of a hydraulic braking force multiplying device of the present invention.

The body 1 has a projecting portion 4 extending toward the master cylinder 3. Shown at 5 is a cup-shaped power piston, which consists of a large diameter portion 5a and a smaller diameter portion 5c, the large diameter portion 5a having one end open and the outer periphery of projecting portion 4 sealingly slidable therein, and the smaller diameter portion 5c having a closed end 5b engagable with as a piston 6 of master cylinder 3. Defined between the projecting portion 4 and the power piston 5 is a working chamber 7.

Designated at 8 is a spring which is disposed between the master cylinder 3 and the power piston 5. Under the action of the spring 8, the power piston 5 is urged against a stop portion 1a of the body 1.

Shown at 9 is a bore which extends through the body 1 coaxially with the piston 6 and which includes a valve seat 10 in the mid portion thereof, and the valve seat 10 is the boundary between a larger diameter bore portion 9a and a smaller diameter bore portion 9b. Shown at 11 is a lid fixedly and sealingly fitted in the larger diameter portion 9a of the bore 9 so as to close the open end of the bore 9 near to the working chamber 7. Designated at 12 is a valve member, which extends slidably and sealingly pierces through the lid 11 and which is supported by the lid 11. The valve member 12 has one end portion 12a extending within the larger diameter portion 9a of the bore 9 so that a valve portion 12b provided in the free end thereof will seat on the valve seat 10 or unseat therefrom. The other end portion 12c of the valve member 12 extends into the working chamber 7, until the free end 12d thereof is positioned in the vicinity of the closed end 5b of smaller diameter portion of power piston 5. The portion of the valve member 12 extending into the working chamber 7 has a larger diameter portion and a smaller diameter portion, between which is formed a shoulder 12e. Disposed between the shoulder 12e and the power piston 5 is a spring 13, which urges the valve member 12 in the direction to seat the valve portion 12b on the valve seat 10. Designated at 14 is a first pressure chamber, which is defined by the inner peripheral wall of the larger diameter portion 9a of bore 9, the outer peripheral wall of the portion 12a of valve member 12, the valve seat 10 and the lid 11. Pressure fluid is normally introduced by way of a fluid introducing passage 15 and a passage 16, into the first pressure chamber 14.

Denoted at 17 is an input shaft, which is slidably and sealingly fitted in the smaller diameter portion 9b of bore 9, and which has a smaller diameter portion 17b and a larger diameter portion, between which is formed a shoulder 17a, the smaller diameter portion 17b of input shaft 17 extending into a deep hole 12f of the valve member 12, with a substantial clearance left therebetween, until the end portion 17c thereof comes to a position in the vicinity of a valve seat 18 provided in the bottom portion of the hole 12f.

Shown at 19 is a second pressure chamber defined between the valve member 12 and the input shaft 17. The second pressure chamber 19 houses therein a spring 20, which urges the input shaft 17 against the stop portion 1b of the body 1, with its one end bearing on the valve member 12.

The second pressure chamber 19 is adapted to be placed in communication with the first pressure chamber 14 or cut off therefrom by the action of the valve portion 12b of valve member 12 seating and unseating from seat 10, while chamber 19 is connected permanently, by way of a radial passage 21 provided in the valve member 12, with the working chamber 7. The second pressure chamber 19 is placed in communication, by way of a passage 22 running through the input shaft 17 longitudinally, with, for example, a fluid discharge passage 23 connected to a fluid reservoir (not shown) provided in the body 1, or cut off therefrom, depending on whether the end portion 17c of the smaller diameter portion of input shaft 17 is seated the valve seat 18 or unseated therefrom.

Thus, the valve seat 18 and the end portion 17c of the smaller diameter portion of input shaft 17 in combination, provide a normally open valve between the working chamber 7 and the reservoir.

Shown at 24 is a push rod connected to a brake pedal (not shown) and having one end bearing on the input shaft 17, that end portion having a cutout portion or a passage 25 for maintaining the passage 22 and discharge passage 23 in communicating relation to each other.

In operation, when the actuating force is applied to the brake pedal so as to bring the device shown in the inoperative condition in FIG. 1 into operation, the inut shaft 17 is moved leftwards by way of the push rod 24. The leftward movement of the input shaft 17 causes the end portion 17c of the smaller diameter portion thereof to engage with the valve seat 18, thereby cutting off the second pressure chamber 19 and the working chamber 7 from the fluid discharge passage 23. When the input shaft 17 is further moved leftwards, then the valve member 12 is moved in the same direction by the force on the valve seat 18, whereby the valve portion 12b is unseated from the valve seat 10, thereby bringing the first pressure chamber 14 and the second pressure chamber 19 into communication with each other. Thus, normally closed valve 10, 12b opens, and pressure fluid is introduced via the passage 21 into the working chamber 7. This causes the power piston 5 to move leftwards, whereby the piston 6 of the master cylinder 3 is actuated in the same direction, thereby effecting braking action. Since the input shaft 17 is subjected to pressure in its pressure receiving portion, which has been exposed in the working chamber 7, a driver receives a reacting force or operating feeling, by way of the input shaft 17, push rod 24 and the brake pedal.

During the above movement, when the reacting force due to fluid pressure acting on the input shaft 17 becomes sliightly larger than the actuating force which is being exerted by the driver on the input shaft 17, the input shaft 17 will be forced back (rightwards) to some extent, and hence the valve member 12 is forced backwards under the actions of fluid pressure and the spring 13, whereby the valve portion 12b seats on the valve seat 10, thereby cutting off communication of the first pressure chamber 14 and the second pressure chamber 19. Such action is effected within the range of resilient deformation of the valve seat 18, with the valve seat 18 and the end portion 17c of the smaller diameter portion of input shaft 17 maintained in contacting relation to each other.

When inputs to the brake pedal are relieved, the input shaft 17 is forced back under the action of fluid pressure and the spring 20 until the end of input shaft 17 contacts the stop portion 1b. Consequently, the end portion 17c of the smaller diameter portion of input shaft 17 is unseated from the valve seat 18, thereby placing the second pressure chamber 19 in communication with the fluid discharge passage 23. Thus, the power piston 5 is also forced back under the action of the spring 8 and another spring (not shown) for returning the piston 6 provided within the master cylinder 3, while discharging pressure fluid within the working chamber 7 to the fluid discharge passage 23, until the open end thereof contacts the stop portion 1a.

The device, as is apparent from the foregoing, acts as a non-stroke type when the source of fluid pressure is in the normal condition. When failure of the source of fluid pressure occurs, fluid pressure does not act on the device. However, the actuating force applied to the brake pedal is transmitted directly to the master cylinder 3.

The push rod 24 and the input shaft 17 are actuated altogether, and then the end portion 17c of smaller diameter portion of input shaft 17 contacts the valve seat 18, thereby shifting the valve member 12, and then the end portion 12d of valve member 12 is brought into contact with the closed end 5b of power piston 5, thereby actuating the power piston 5.

The device functions as a directly actuating device at the time of the failure of source of fluid pressure. In this case, either the interstice between the end portion 17c of diametrically reduced portion of input shaft 17 and the valve seat 18, or the interstice between the end portion 12d of valve member 12 and the closed end 5b of power piston 5 is extremely small, and hence the ineffective portion of the stroke is short.

Referring to the valve member 12 and the spring 13 urging same, even when the power piston 5 is in a condition forcing the piston 6 of master cylinder 3 to the compressed condition, i.e. even when the power piston 5 is in the maximum extended condition, the spring 13 requires a spring force sufficiently large to urge the valve member 12 in the valve closing direction, overcoming the sliding resistance of the sealing means provided between the lid 11 and the valve member 12. Since the above-described sealing means (such as a seal ring) has a comparatively large diameter and internal pressure in the first pressure chamber 14 is quite high, the sliding resistance is also quite high. Accordingly, a rather large spring force 13 will result, particularly in case the device is in the inoperative condition as shown in FIG. 1. This results in an increase in the actuating force necessary for initiating movement of the valve member 12, leading to a problem that a driver experiences a bad operating feeling.

Assuming that S1 is representative of the effective cross-sectional area of the valve portion 12b and S2 is representative of the effective cross-sectional area of the portion where the valve stem 12 extends through the lid 11, and $S1 < S2$, then the force Fp of $(S2-S1) \times$ (pressure P in the first pressure chamber 14), will act on the valve stem 12 to urge same in the direction of opening the valve. Therefore, assuming F is representative of the force of spring 13, the closer to the spring force F is the aforesaid force Fp, the smaller is the actuating force which must be applied to the valve member 12 for starting the movement thereof, with the result that an improved operating feeling is given to the driver.

Figure 2:
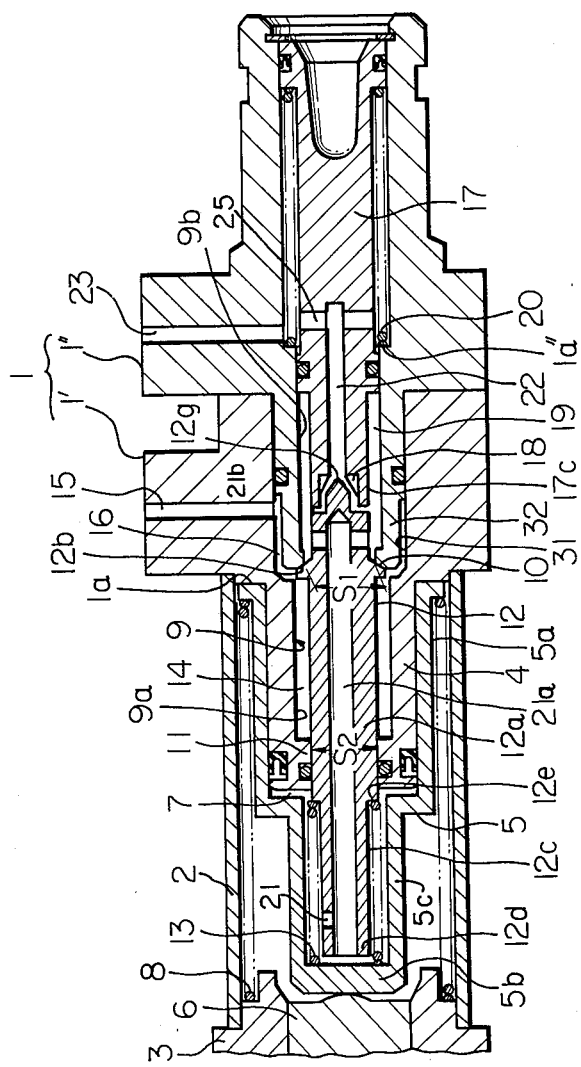
FIG. 2 is a longitudinal cross-sectional view showing a modification of the device of FIG. 1.

FIG. 2 illustrates another embodiment of the present invention, wherein components common to FIGS. 1 and 2 are shown by identical reference numerals.

In the following description, only the differences from the first embodiment will be referred to.

The body 1, in this embodiment, consists of two members 1' and 1''. The member 1' has, in the portion coupled with the member 1'', a larger diameter bore 31 connected to the bore 9. The member 1'' has a smaller diameter projecting portion 32 which extends into the larger diameter bore 31, leaving a gap between the bore wall and same, thereby being coupled with the member 1' in the aforesaid coupling portion, and the end of which serves as a valve seat 10. The aforesaid gap serves as a passage 16 for introducing pressure fluid into the first pressure chamber 14. The lid 11 through which the valve member 10 extends if formed integrally with the member 1'.

The valve member 12 and the input shaft 17 are in directly opposed relation to each other, rather than in fitted relation, thereby defining the second pressure chamber 19. In this case, the valve seat 18 is provided in the end portion 17c of input shaft 17, so that the corrresponding end 12g of valves member 12 will seat on the valve seat 18 or unseat therefrom, thereby providing a normally open valve for opening or closing the discharge passage 23. Valve member 12 has a bore 21a therein from which ports 21 open into working chamber 7, and ports 21b open into second pressure chamber 19.

The spring 20 acting on the input shaft 17 is disposed between the shoulder 1″a of member 1″ and the input shaft 17.

It is apparent from the foregoing that the second embodiment has more practical construction, as compared with the first embodiment.

Operation of the second embodiment will be obvious from the first embodiment of FIG. 1 and hence no description is given.

Figure 3:
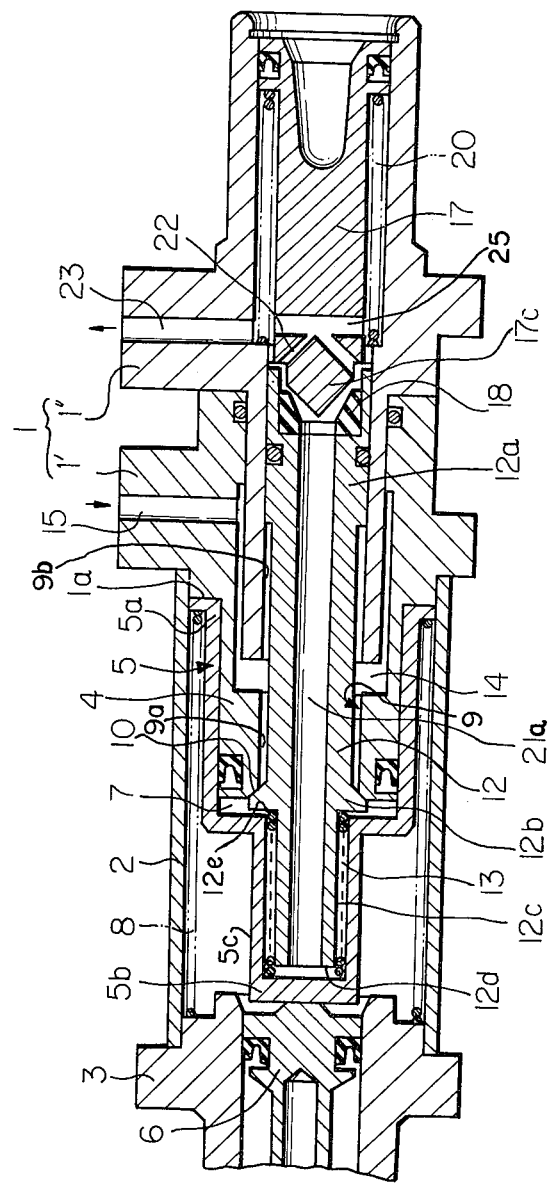
FIG. 3 is a longitudinal cross-sectional view showing a modification of the device of FIG. 2.

FIG. 3 illustrates a modification of the embodiment of FIG. 2, in which components equivalent to those of FIG. 2 are shown by the identical reference numerals.

In the embodiment, the normally open valve communicating with the discharge passage 23 is provided by the end portion 17c of input shaft 17 and the resilient valve seat 18 disposed in one end 12 of the valve member 12. The normally closed valve provided between the pressure chambber 14 and the fluid introducing passage 15 connected to the pressure fluid source and the working chamber 7 is constituted by the valve seat 10 on the end of projecting portion 4 of the member 1′ of the body 1 and the valve portion 12b provided on the valve member 12.

Operation of the device of the third embodiment is similar to the second embodiment shown in FIG. 2.

Figure 4:
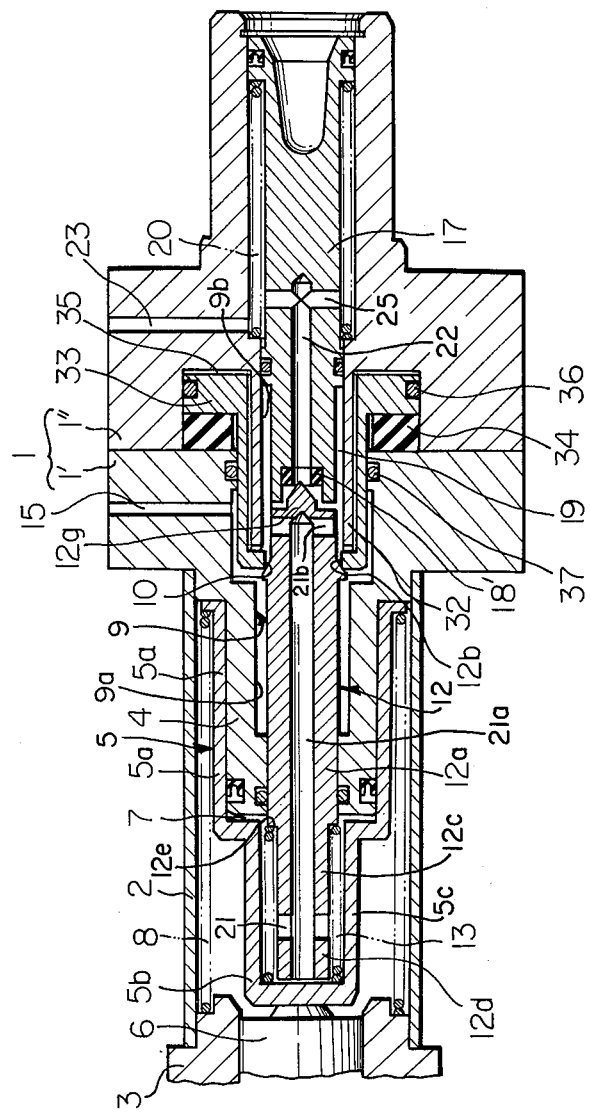
FIG. 4 is a longitudinal cross-sectional view showing a further modification of the device of FIG. 2; and, FIG. 5 is a longitudinal cross-sectional view showing a modification of the device of FIG. 4.

FIG. 4 shows another modification of the embodiment of FIG. 2, in which components equivalent to those of FIG. 2 are shown by the identical reference numerals.

In this embodiment, the normally open valve is provided by the valve seat 18′ carried by the end of input shaft 17 and the end portion 12g of valve member 12, but the valve seat 18′ is not of a resilient material. The normally closed valve is provided by the valve 12b provided on the valve member 12 and the valve seat 10 provided on the left end of free piston 33. The leftward movement of the free piston 33 is subjected to reacting force of a resilient member 34. A chamber 35 defineed by the right-hand end of the free piston and the member 1′ is connected with the pressure chamber 19 through the space between the inner peripheral surface of free piston 33 and the exterior surface of portion 32, and thus the resilient member 19 is compressed under the pressure from the working chamber 7, to thereby urge the valve 12b against the valve seat 10, the valve thereby being closed. In the preceding embodiments, to provide a pressure equilibrium, the valve member 12 is moved rightwards, compressing the resilient member, thereby closing the valve 12b. While in this embodiment, the free piston 33 compresses the resilient member 34 to be moved leftwards, thereby closing the valve 12b. The other points are quite the same as in the preceding embodiments.

Shown at 36 and 37 are sealing members for providing a difference in the effective pressure receiving area between the right-hand side of the free piston 33 and the left-hand side thereof.

Figure 5:
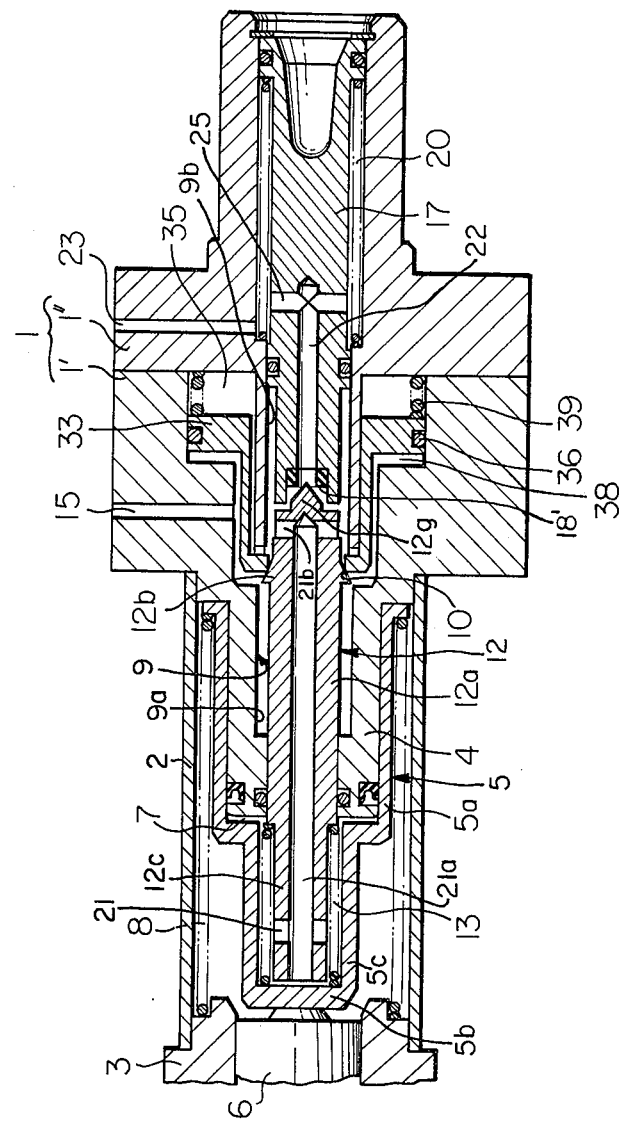

FIG. 5 shows a modification of the embodiment of FIG. 4. The chamber 35 defined by the right-hand side of free piston 33 receives pressure from the working chamber 7 as in the former embodiment, but instead of a resilient member being disposed on the left-hand side of the free piston, there is defined a chamber 38 for receiving pressure from the entrance port 15. The chamber 35 houses therein a compression spring 39 for impartng assistance to the pressure in the chamber 35. Stated otherwise, in this embodiment, the movement in the axial direction of valve seat 10 due to the resilient member 34 is provided by the pressure difference between the chambers 35 and 38 and by the reacting force of the spring 39.

The points other than the above-described are similar to the preceding embodiments.

As is apparent from the foregoing, the hydraulic braking device of the present invention has a simple construction and brings about many advantages enumerated in the following.

1. Since the valve seat is movable depending upon the pressure in the working chamber, little or no returning motion of pedal by way of the input shaft is experienced, avoiding the risk that a driver feels uncomfortable. Even a step-by-step application of the actuating force to the brake pedal provides smooth actuation of the device, with the result that an improved operating feeling is given to a driver.

2. If the operating force is abruptly applied to the brake pedal, there is no risk that a large quantity of pressure fluid is abruptly streamed into the working chamber, and the device presents a high responsiveness to inputs, so that safety is insured and a driver experiences a good operating feeling.

3. The device functions as a non-stroke type device when the source of fluid pressure is in the normal operative condition, and when trouble occurs in the source of fluid pressure, the device actuates directly the master cylinder directly and only an extremely small ineffective stroke occurs, so that a driver will be relieved from fatigue, as well as safety being improved.

We claim:

1. A hydraulic braking force multiplying device for motor vehicles, comprising a body coupled to a master cylinder, a portion on said body which projects in the direction of said master cylinder, a cup-shaped power piston slidably mounted on said body coaxially with the master cylinder and engaged with the piston of said master cylinder, said cup-shaped piston when it moves toward said master cylinder defining therewithin and with said projecting portion a working chamber, said body having a pressure chamber therein having means for placing said pressure chamber in communication with a source of pressurized fluid, said body having a bore therein on the end remote from said projecting portion and opening into said pressure chamber, an input shaft slidable in said bore in the direction of movement of said cup-shaped power piston on said projecting portion, said input shaft having a drain bore therethrough in communication with a drain to a fluid reservoir, a valve stem member extending through said projecting portion from said cup-shaped power piston and through said pressure chamber to adjacent the end of said input shaft and being movable into and out of said working chamber, spring means engaging said valve stem member and urging it in a direction of the working chamber toward said input shaft, said valve stem member having a bore therein opening into said working chamber, a first valve seat means in said body and with which said valve stem member is engageable to form a first valve for placing said working chamber and said pressure chamber in communication when said first valve is open, the end of said input shaft toward said pressure chamber and a portion of said valve stem member facing toward said input shaft having valve member means and a second valve seat means thereon cooperating to form a second valve for placing said working chamber and said drain bore in communication when said second valve is open, one of said second valve seat means and said valve member means being resilient for causing both said first and second valves to be closed during the first part of the stroke of said input shaft toward said valve stem member, whereby when there is no pressure in said pressure chamber, the power piston will be moved directly by the movement of the input shaft engaging the valve stem member which in turn engages the cup-shaped power piston.

2. A hydraulic braking force multiplying device according to claim 1, in which said second valve seat means is a resilient valve seat and is disposed on the valve stem member.

3. A hydraulic braking force multiplying device according to claim 1, in which said second valve seat means is a resilient valve seat and is disposed in the end of the input shaft.

4. A hydraulic braking force multiplying device according to claim 1 in which said first valve seat means comprises an axially movable valve seat member, a fixed stop in said body on the opposite side of said valve seat member from said power piston, and a body of resilient material normally urging said valve seat member against said fixed stop, the space between said valve seat member and said stop being in communication with said working chamber, whereby said valve seat member is moved axially toward said power piston in response to fluid pressure created in the working chamber.

5. A hydraulic braking force multiplying device according to claim 1 in which said first valve seat means comprises an axially movable valve seat member, a fixed stop in said body on the opposite side of said valve seat member from said power piston, the space on the same side of said valve seat member as said power piston being in communication with said pressure chamber for urging the valve seat member against said fixed stop due to the pressure in said pressure chamber, and the space between said valve seat member and said stop being in communication with said working chamber, whereby said valve seat member is moved axially toward said power piston in response to fluid pressure created in the working chamber.

* * * * *